Dec. 9, 1930.  W. K. CABOT  1,784,131
CAN MAKING MACHINERY AND APPARATUS
Original Filed Nov. 2, 1927   12 Sheets-Sheet 5
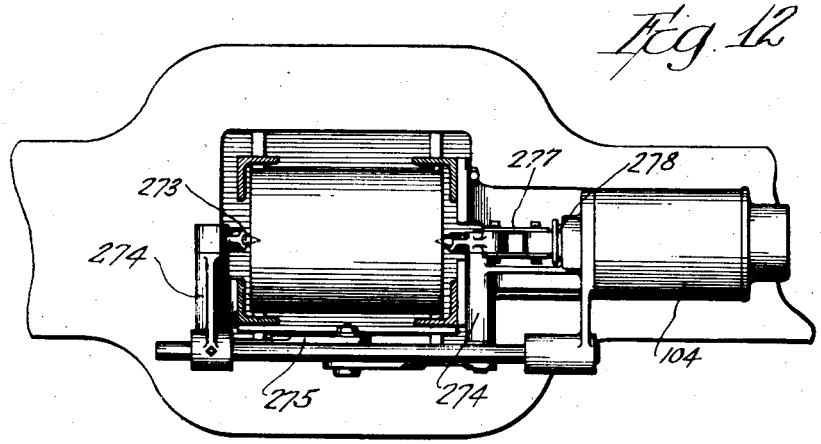
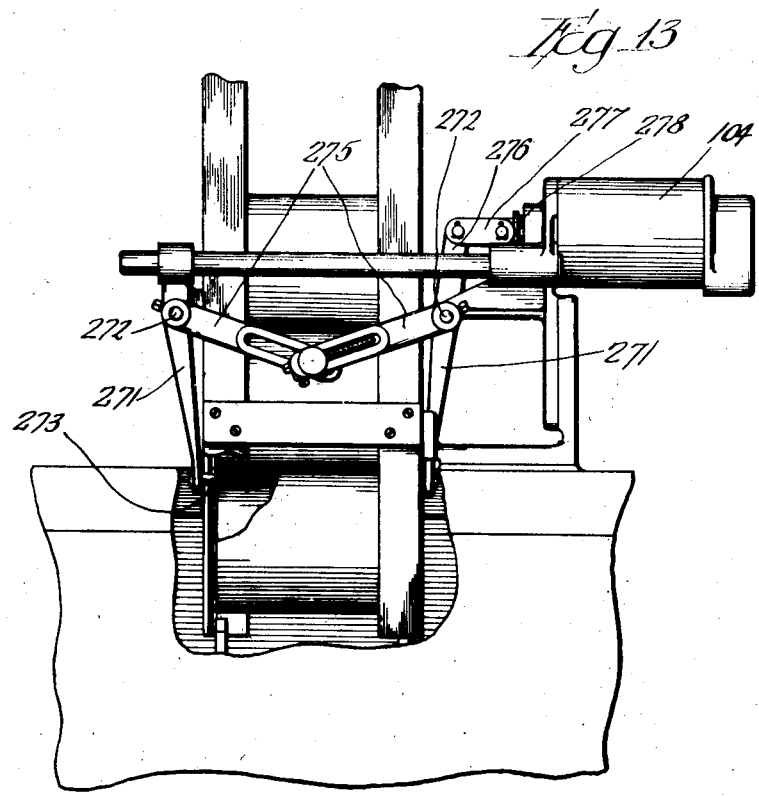
INVENTOR
Walter K. Cabot
BY
Munday
Clarke & Carpenter
ATTORNEY Dec. 9, 1930.  W. K. CABOT  1,784,131
CAN MAKING MACHINERY AND APPARATUS
Original Filed Nov. 2, 1927  12 Sheets-Sheet 6
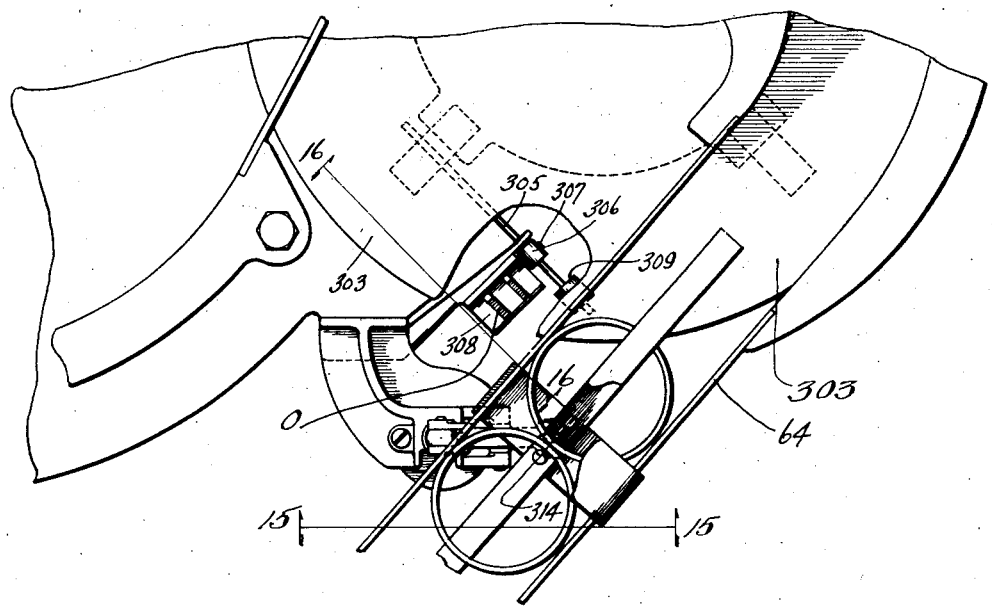
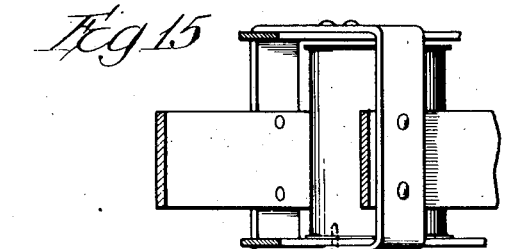
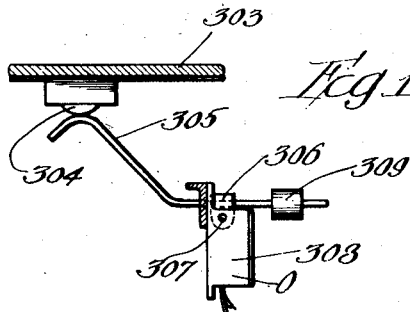
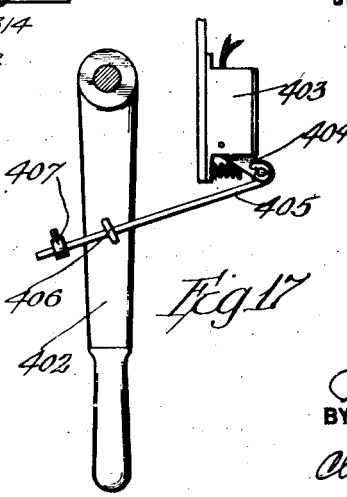
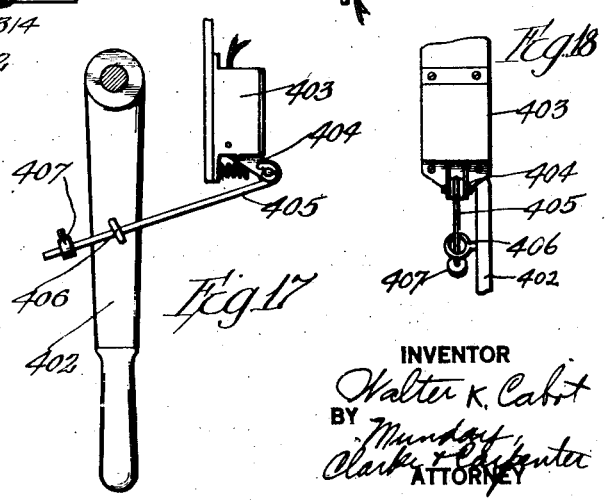
INVENTOR
Walter K. Cabot
BY
ATTORNEY

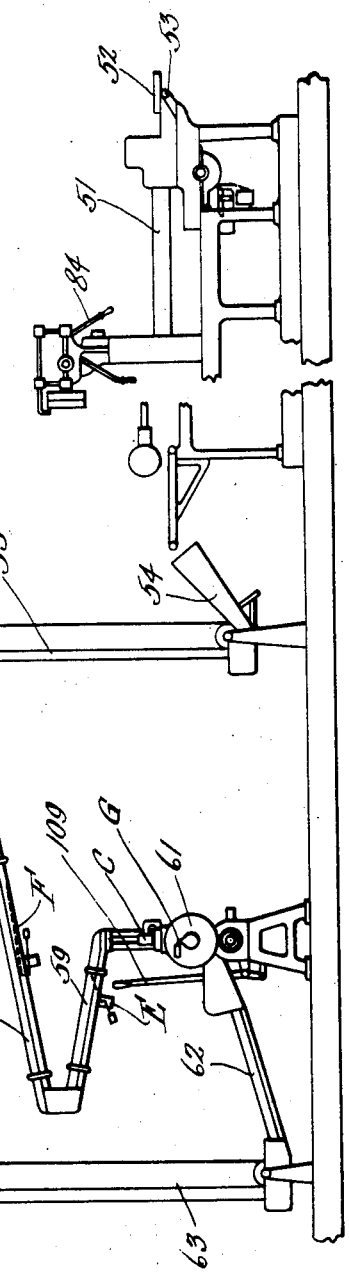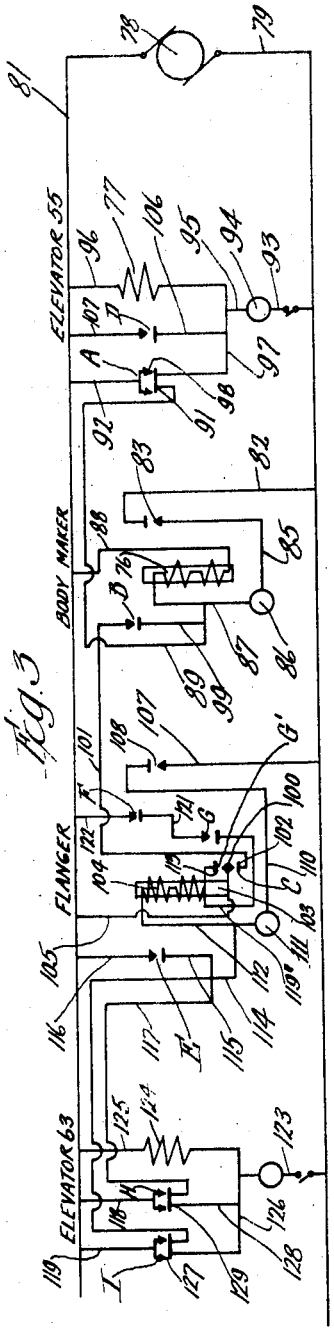

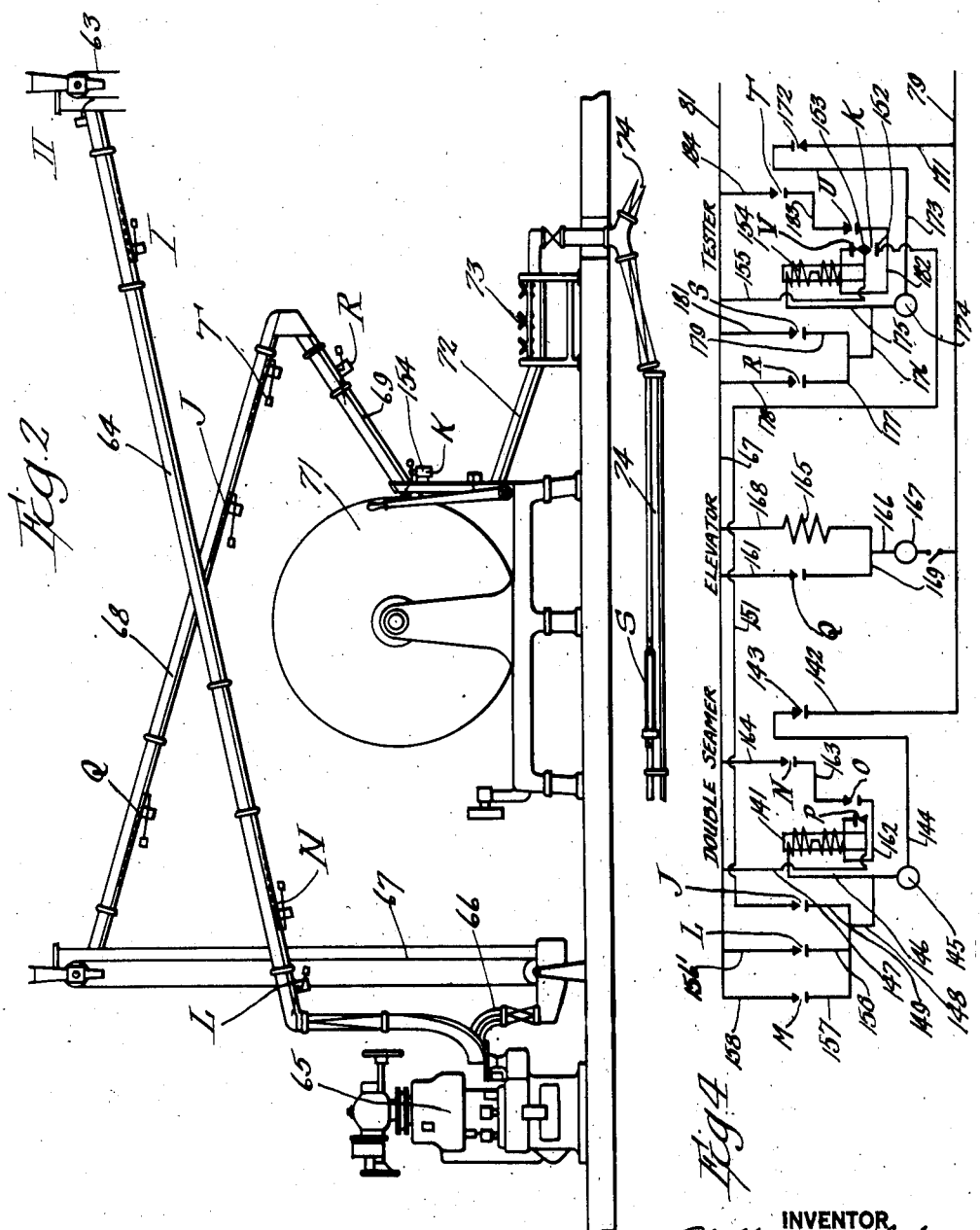

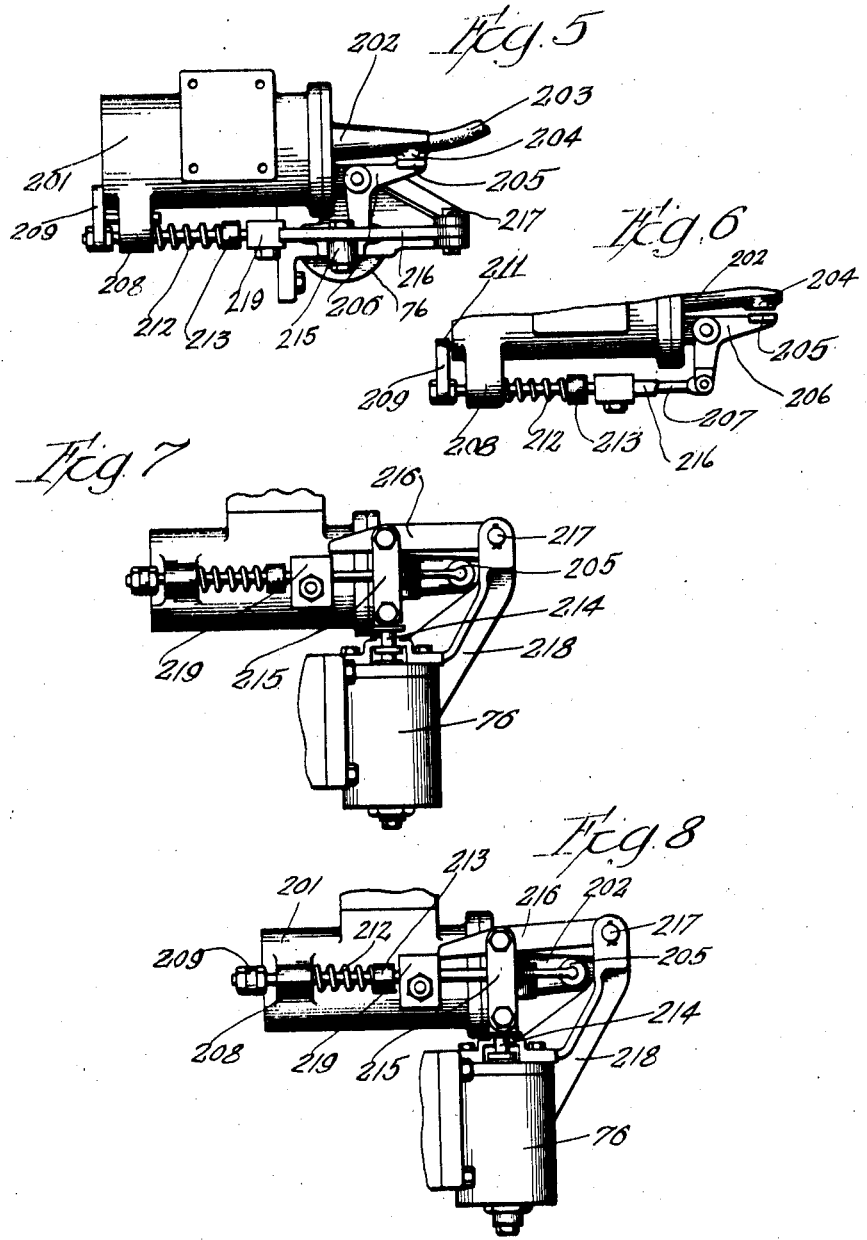

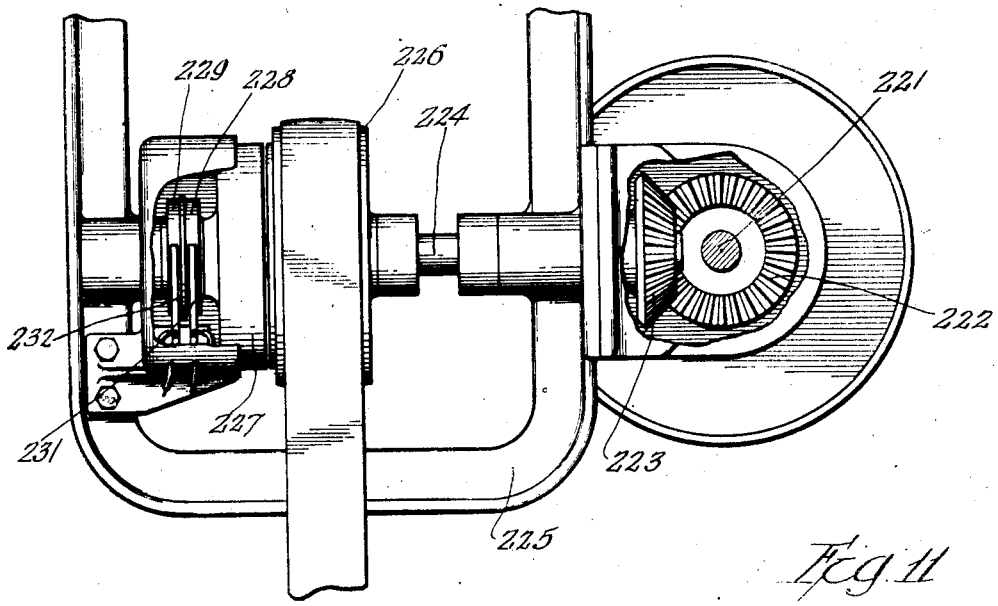
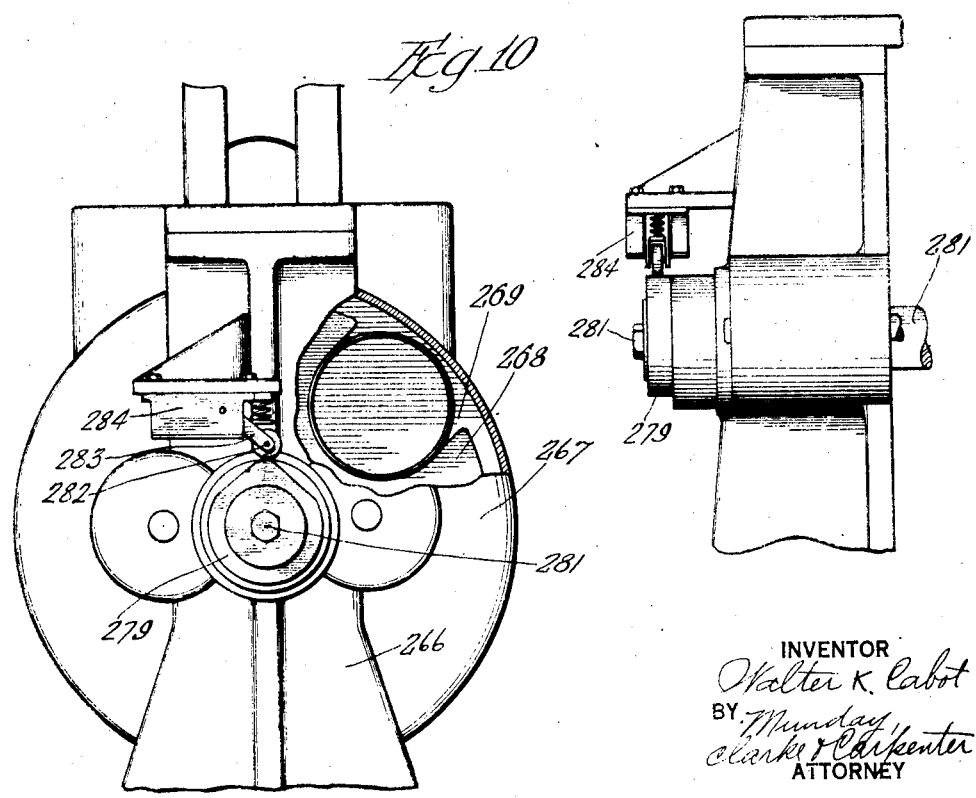

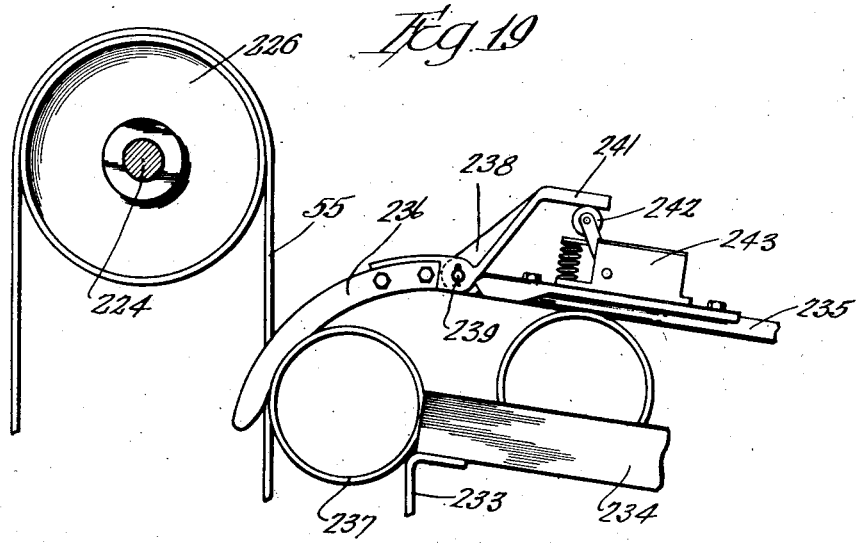
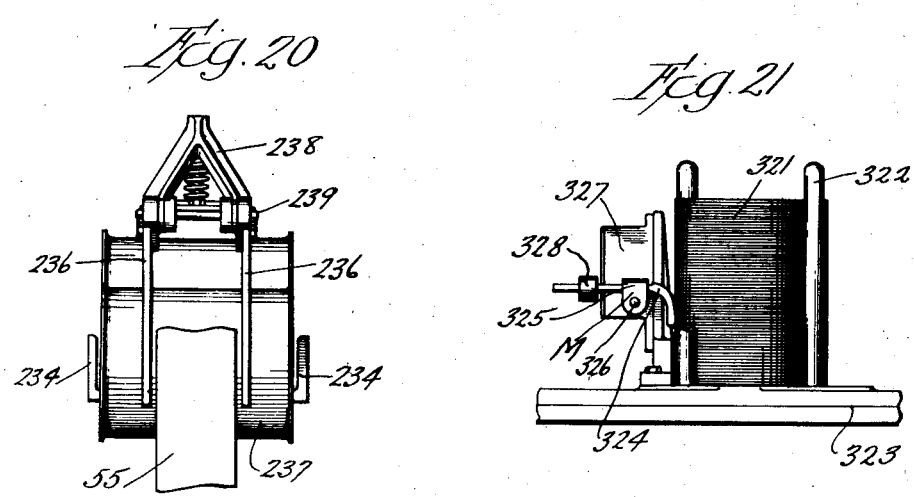
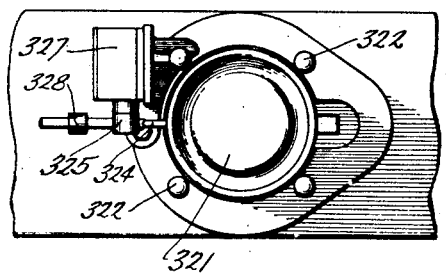

Dec. 9, 1930.  W. K. CABOT  1,784,131
CAN MAKING MACHINERY AND APPARATUS
Original Filed Nov. 2, 1927  12 Sheets-Sheet 8

INVENTOR
Walter K. Cabot
BY
Munday Clarke Carpenter
ATTORNEY

Dec. 9, 1930. W. K. CABOT 1,784,131
CAN MAKING MACHINERY AND APPARATUS
Original Filed Nov. 2, 1927 12 Sheets-Sheet 9
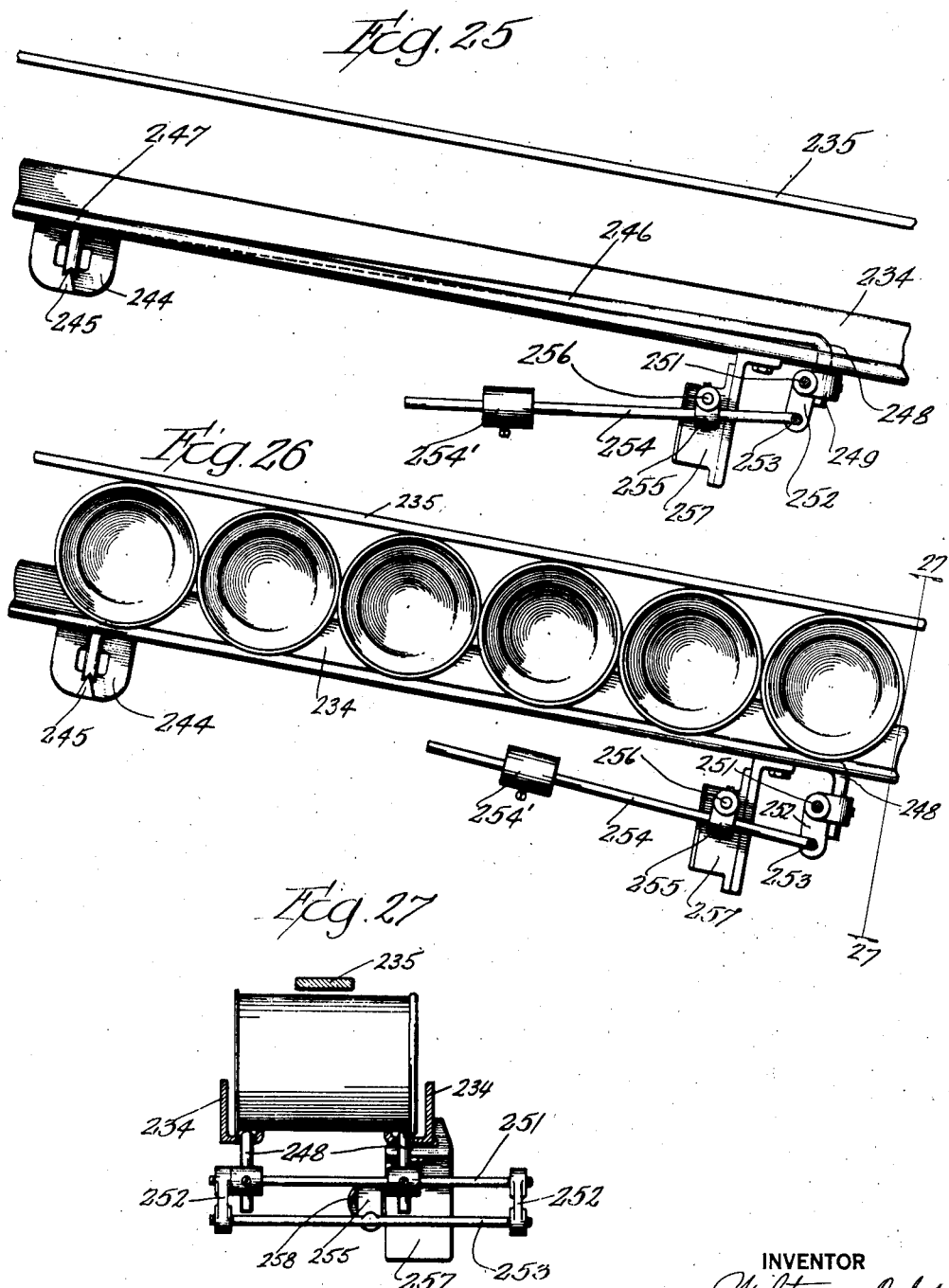

Dec. 9, 1930.  W. K. CABOT  1,784,131
CAN MAKING MACHINERY AND APPARATUS
Original Filed Nov. 2, 1927  12 Sheets-Sheet 10
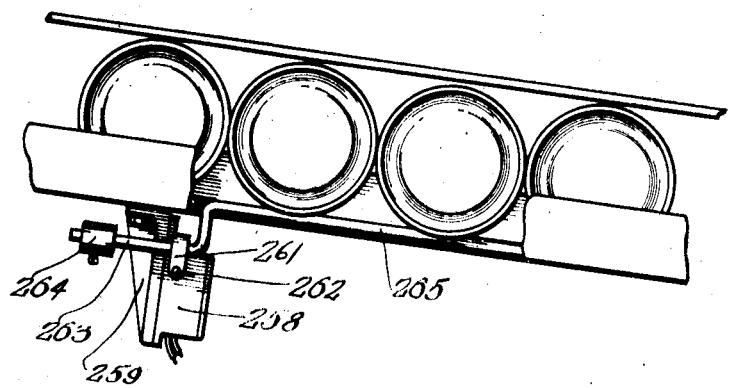
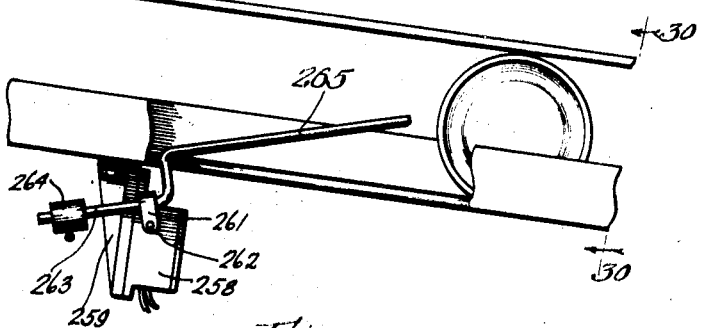
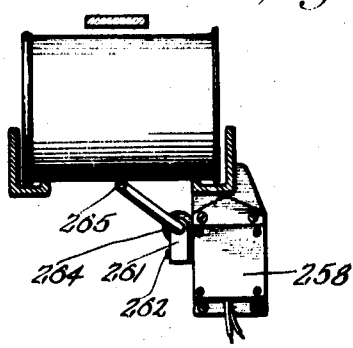
INVENTOR
Walter K. Cabot
BY Munday,
Clarke + Carpenter
ATTORNEY

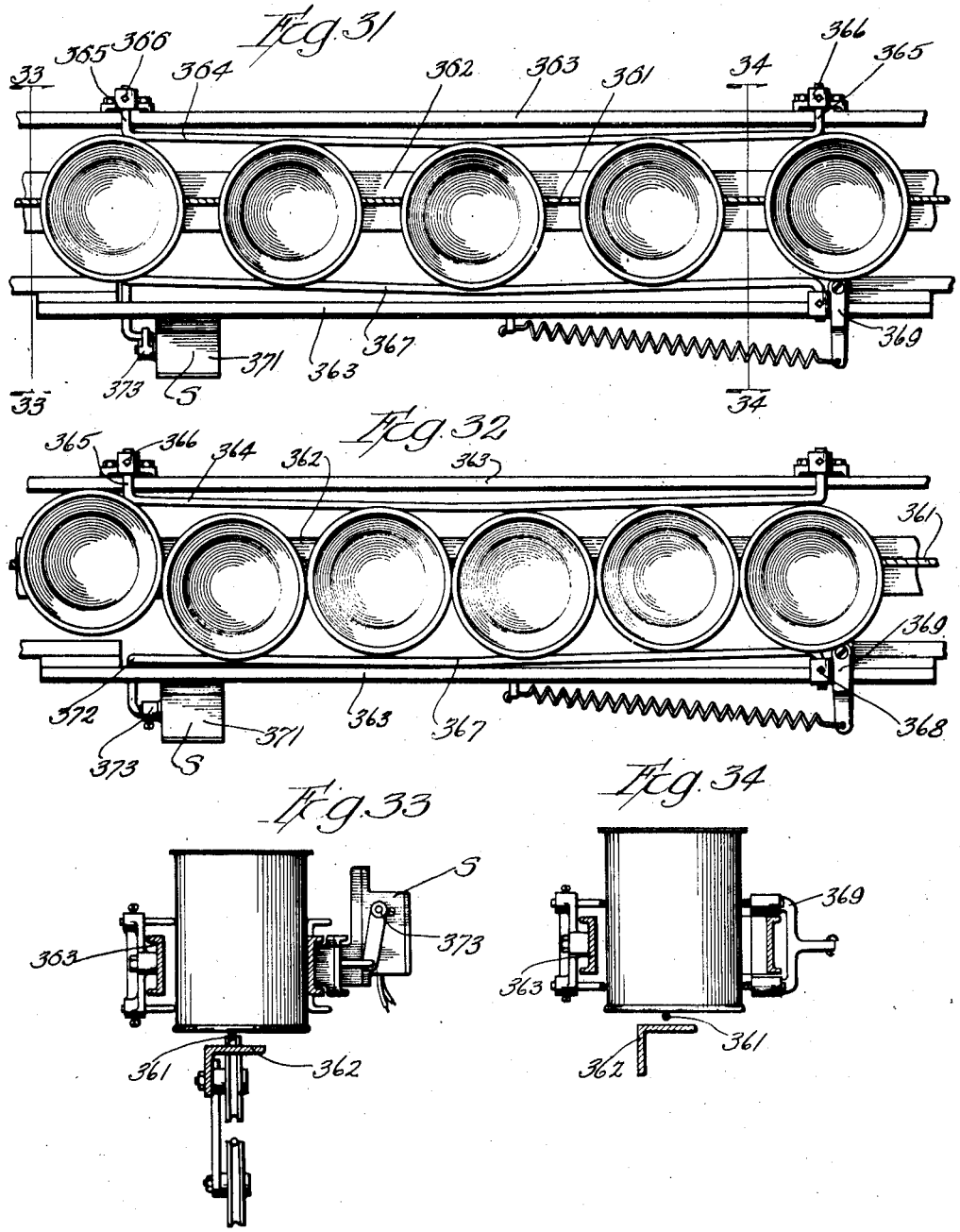

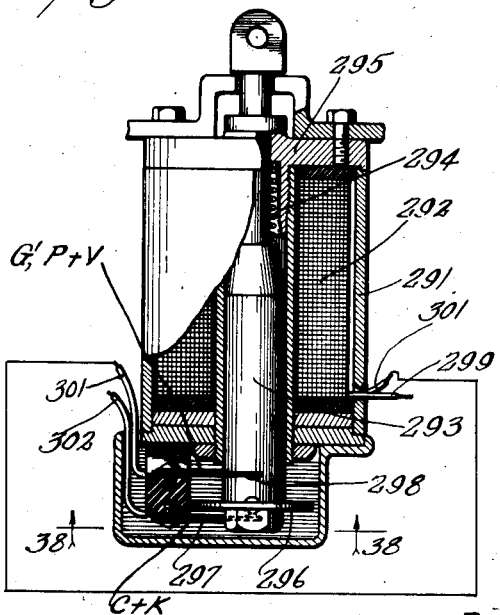
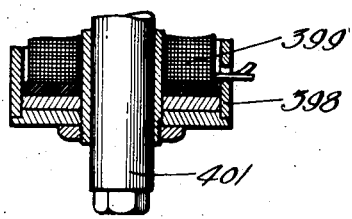
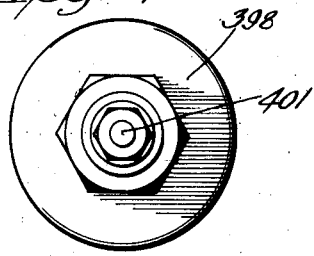
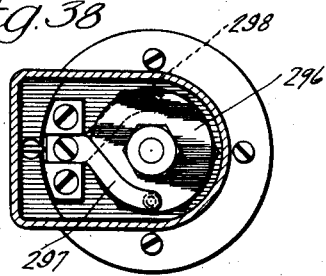
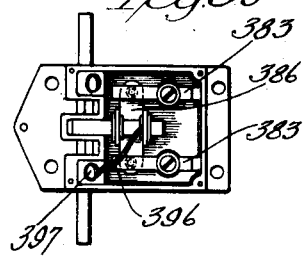
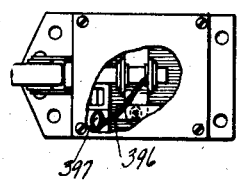
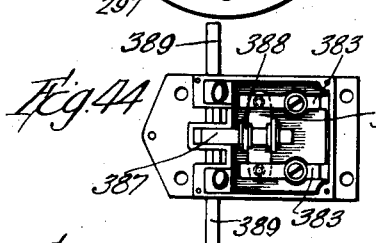
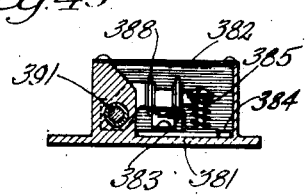
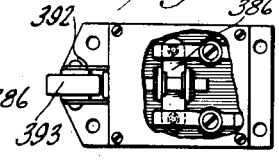
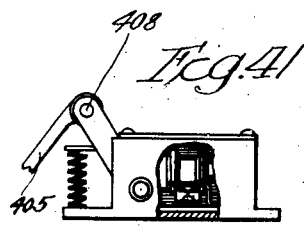
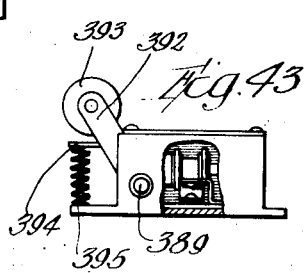

Patented Dec. 9, 1930

1,784,131

UNITED STATES PATENT OFFICE

WALTER K. CABOT, OF MONTCLAIR, NEW JERSEY, ASSIGNOR TO AMERICAN CAN COMPANY, OF NEW YORK, N. Y., A CORPORATION OF NEW JERSEY

CAN-MAKING MACHINERY AND APPARATUS

Application filed November 2, 1927, Serial No. 230,442. Renewed March 3, 1930.

This invention relates in general to can making machinery and apparatus and while it has more particular reference to such machinery and apparatus arranged in associated relation for the production of finished cans through synchronized automatic action of such machines, it will be readily manifest that the invention has valuable application in other connections and also when employed in the operation of dissociated machines.

The principal object of the invention is the provision of an electric, fully-automatic control adapted for use either with a line of machines operating successively upon articles which pass through the various machines or for use with single machines and which will insure maximum of production, the while fully protecting each machine and device involved against injury.
Another and highly important object of the invention is a control of the character set forth which will automatically stop any and/or all of the machines involved upon establishment of adverse conditions in said machines in the equipment supplying subject cans or articles to said machines and in the mechanism or devices through or by reason of which the cans or subject articles are removed from each machine involved after operation thereon. And all this with minimum interruption to the operation of each of the units of the line. In this regard, my invention contemplates the provision of a control employing double swage mechanisms or double electric contacts so arranged as to cause a machine unit in the line to be started automatically and in synchronism with the starting of a setting unit and without waiting for the transfer devices to clear.
This invention contemplates both the starting and the stopping of the various units controlled individually to insure correct operating conditions in starting and the elimination of all needless interruption to the individual units. In accordance with the invention no unit is stopped until some condition, either before or behind it, renders further operation at the moment either dangerous to product or machine or needless to maximum synchronated speed of the line.

The invention further contemplates the construction and arrangement of the control to permit an operator to purposely halt the operation of a machine or stop its moving parts for the making of repairs, etc., with minimum interruption of operation of the line or the automatic resumption of the speediest possible synchronized action when the machine thus stopped by the operator is again placed in action.

A further object of the invention is the provision of such a control adapted to function for the accomplishment of the foregoing purposes by halting as an incident to its controlling action a minimum number of the normally continuously moving parts in the various machines or units controlled. The various units are controlled in accordance with the preferred embodiment of the invention by merely interrupting the feed to them individually of the article upon which they are to operate. The runways between the individual units are preferably constructed and arranged to contain for either transfer or storage the articles already in the individual machine at the time its feed of additional articles is interrupted. The arrangement moreover is such that under any normal operation of the control in interrupting the full activity of the line a number of can bodies or other articles is automatically stored for delivery to each non-operating machine immediately upon re-establishment of operating conditions and to thereafter provide for continued normal speed production, preceding machines supplying subject articles before the storage supply is exhausted.

Another important object of the invention is the provision of a control which will insure proper feeding conditions to the units of the line after interruption of operation. In the manufacture of can bodies certain units, as for example the flanger, tester, etc., require a considerable number of can bodies in the runway or guide immediately delivering into the unit to insure accurate, quick placement of the can body in the present turret pocket and my invention therefore contemplates the delay of the feeding to such machine or machines until the desired number of can bodies are arranged in storage and in position to insure prompt entry of the presented body into the turret pocket.

Another important object of the invention is the provision of an electric control for the elevators arranged in transfer mechanisms between units and controls the operation of said elevator in accordance with the general scheme of the control of the line of which the elevators form a part.

Another important object of the invention is the provision of a control of the character described, wherein provision is made against damage to the cans as an incident to their transfer from one machine to another and as an incident also to the operation of the control itself.

Another important object of the invention is the provision of a control of the character described employing a minimum of mechanical devices and particularly constructed and arranged to require a minimum number of delicate parts or parts which will require frequent repair, replacement or adjustment.

Reference is here made to the application of Lyman L. Jones, pending in the United States Patent Office and bearing Serial No. 58,562 filed Sept 6, 1925, and assigned to American Can Company, as corporation of New Jersey, assignee of this application, upon which this invention is an improvement from many material aspects.

Numerous other objects and advantages of the invention will be apparent from the following description, which, taken in connection with the accompanying drawings, discloses a preferred embodiment thereof.

Referring to the drawings,

Figure 1 is a partial schematic view of a line of can machinery;

Fig. 2 is a similar view illustrating the remainder of the line;

Figure 23:
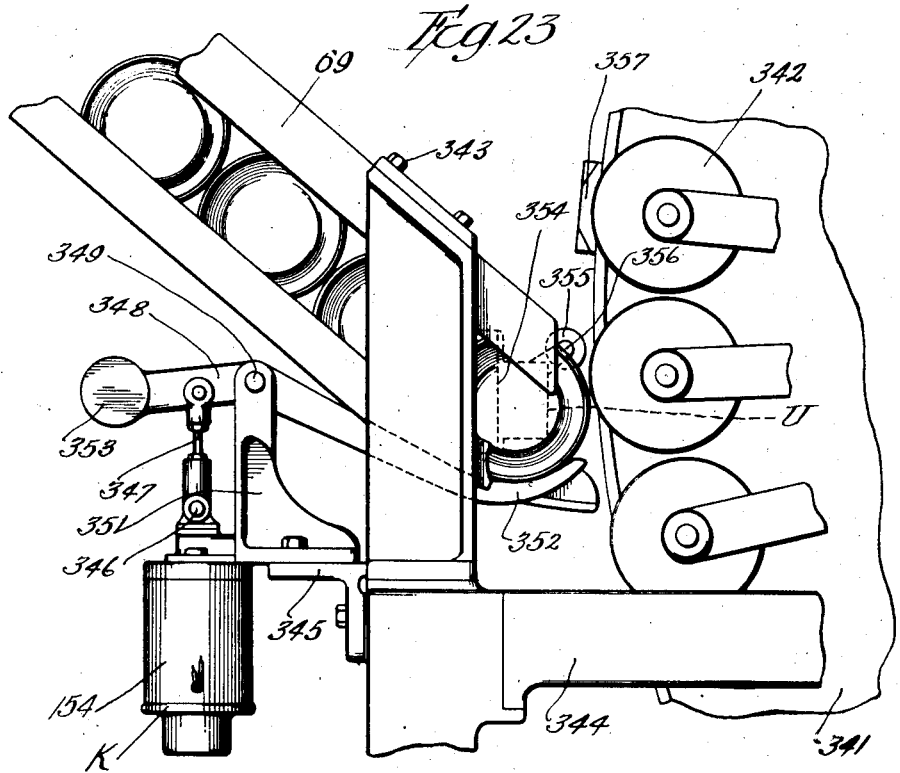
Figure 24:
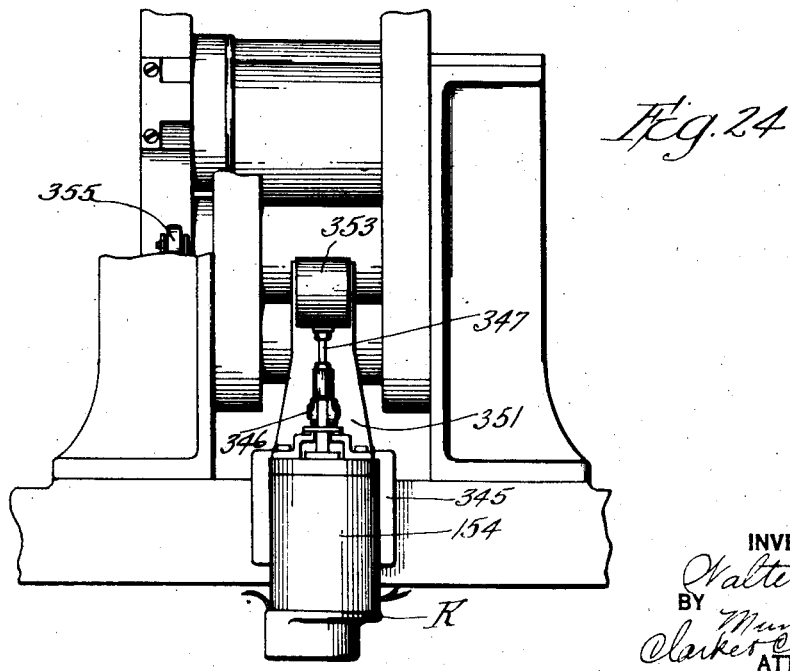

Figs. 3 and 4 together constitute a preferred wiring diagram;

Fig. 5 is a top plan view of the body maker feed control;

Fig. 6 is a partial view of the same taken similarly and showing the parts in different relation;

Figs. 7 and 8 are side elevations of this body maker feed control, the parts being arranged in operative relation in Fig. 7 and in position to interrupt the feed in Fig. 8;

Fig. 9 is a view partially in elevation and partially in section illustrating the elevator clutch construction;

Fig. 10 is a view partially in section and partially in elevation disclosing the flanger and a part of the flanger control;

Fig. 11 is a side elevation thereof;

Fig. 12 is a top plan view of the feed control to the flanger;

Fig. 13 is a side elevation thereof;

Fig. 14 is a partial schematic view showing the can body feed control at the double seamer;

Fig. 15 is a section taken substantially on the line 15—15 of Fig. 14;

Fig. 16 is a section taken substantially on the line 16—16 of Fig. 14;

Fig. 17 is a partial detail illustrating a typical clutch lever control provided at some or all of the units of the line;

Fig. 18 is a side elevation thereof;

Fig. 19 is an enlarged detail showing the control switch and attendant mechanism located at the transfer point from an elevator to a gravity runway or guide for the can body;

Fig. 20 is a view looking from the left in Fig. 19;

Fig. 21 is a side elevation of the control switch located at the can end feed of the double seamer;

Fig. 22 is a top plan view thereof;

Fig. 23 is a detail of the feed control to the tester, a portion of the tester being shown fragmentarily;

Fig. 24 is a view looking from the left in Fig. 23;

Fig. 25 is a full runway control, parts being shown in section and parts in elevation;

Fig. 26 is a similar view showing the position of the can bodies for actuation of the control;

Fig. 27 is a section taken substantially on the line 27—27 of Fig. 26;

Fig. 28 is a partial elevation of an empty runway control, parts being cut away and the can bodies being disclosed in position and arrangement to render said control inoperative;

Fig. 29 is a similar view showing the arrangement of the parts when said control is in operation;

Fig. 30 is a section taken substantially on the line 30—30 of Fig. 29;

Fig. 31 is a top plan view of the cableway delivering can bodies after being tested and counted;

Fig. 32 is a similar view showing the cans overcrowding said runway and operating the control there provided;

Figs. 33 and 34 are sections taken respectively upon the line 33—33 and 34—34 of Fig. 31;

Figs. 35, 36 and 37 are detail views taken variously of one of the control relays or magnets preferably employed at a number of the can line units;

Fig. 38 is a section taken substantially on the line 38—38 of Fig. 35; and

Figs. 39 to 45 inclusive are detail views shown partly in section of the various switch arrangements employed in the preferred embodiment of the invention.

*General description of can line*

Referring first to Figures 1 and 2 a general description of a can making line will be first undertaken. In the manufacture of cans flat body blanks of suitable dimension are stacked at the feed end of the body maker. This machine is schematically illustrated at 51 in Fig. 1, the blanks being arranged upon a stack support indicated at 52. These blanks are individually removed by a suction cup or head 53 from the bottom of the stack and arranged in processional order by feed slides which intermittently operate to move the blanks through the body maker, which first notches the ends of the blank, then forms the ends into hooked portions, thereafter the blanks are bent about a horn or mandrel, the hooked edges intergaged and compressed to give tubular form to the body. Or the bodies may be given the tubular form before the edges are provided with the hooked portions. The latter is the preferred form. The seam thus provided is soldered at a machine adjacent the body maker and the bodies fed on out into a chute 54 which communicates at its bottom with an elevator 55 adapted to lift the can bodies to a zig-zag gravity runway or guide comprised of legs 56, 57, 58 and 59 down which the can bodies roll by gravity to a flanger 61 in which the ends of the formed body are flanged outwardly for the reception of the can ends to permit of double seaming.

The flanged bodies leave the flanger down a runway 62 at the lower end of which they are received by a second elevator 63 from the top of which they enter a runway 64 which delivers them to a double seamer 65. Can ends are separately supplied to the double seamer and in it each body receives a can end, the seamer double seaming the end in place thus closing one end and rendering the can in condition for delivery to the packer. The cans thus finished are delivered down a runway 66 to an elevator 67 in turn lifting them to the top of a zig-zag gravity runway composed of the legs 68 and 69. This runway in turn feeds the cans into a can tester 71 in which the cans are tested for leaks in the seam. A runway 72 receives the cans with perfect seams (the leaky cans being sorted out by the tester) and conveys them past counting devices 73 into the disposal conveyors 74 from which they are removed for storage or packaging or stacking in the cars.

*General description of electric line control*

An electric control for the can line is provided which synchronizes the various units for maximum output, this control being designed to provide minimum interruption upon the establishment of adverse conditions anywhere in the combined apparatus. The control in the present embodiment of the invention effects merely the feed of the can to the separate units forming the can-making line and is governed in the main by the conditions in the elevators, runways, guides, etc., that form the transfer devices between units in the line. The moving parts of the various machine units continue their action uninterruptedly, subject of course to their individual protective controls, where such are provided, and to their stoppage by the operator as he may deem desirable.

The various line units complete their operations upon the can bodies previously fed into them and if such can bodies or can ends for any reason whatsoever are not fed to the units, they run idly until conditions permit the resumption of active operation. The control also contemplates and provides for accurate timing of delivery of the can bodies into the several machines when feeding starts after an interruption.

*Control of the body maker*

The feeding of the blanks to the operative stations in the body maker is interrupted under two different conditions, which are, (1) accumulation of can bodies in the zig-zag conveyor between the body maker and flanger at a predetermined point and when the flanger has stopped, and (2) a jam at the top of the elevator 55. In the event feeding is stopped because of a jam at the top of the elevator, the elevator is also stopped, this is accomplished by the closing of contacts controlling the elevator movement, which contacts operate simultaneously with contacts stopping the body maker itself. In the practical operation of the apparatus this only occurs when a deformed body is presented for delivery to the zig-zag conveyor.

In the event that the body maker is stopped through the accumulation of cans at a predetermined point in the conveyor, the elevator runs until the cans in the zig-zag conveyor have reached a higher predetermined point, this being a distance above the point stopping the body maker and about that adapted to accommodate the can bodies in process in the manufacture of body making itself at the time of stoppage of feed.

When the flanger has stopped receiving cans from any cause and the cans have become stored in the zig-zag conveyor until they reach the point B further feed of blanks to the body maker is interrupted, such interruption, however, not occurring unless feed to the flanger has ceased because cans cannot fill up in runway as long as the flanger feed operates. A control circuit for rendering the blank feed inoperative includes contacts located at B which are automatically closed by accumulation of cans in the leg 57 and contacts also at C closed by interruption of feed to the flanger, closing of both said contacts (the one by the stopping of the flanger feed and the other by the surplus cans in the zig-zag conveyor) completes the circuit just mentioned and no further blanks are fed into the body maker. The operation of the conveyor 55 however continues and conveys the can bodies previously fed to the body maker and still passing through it as they are delivered and transfers them to the runway above the point B. If or when the bodies accumulate in this zig-zag runway to the point D, a separate circuit is completed which halts the action of the elevator 55. Conditions remain as thus established until the flanger has started or for other reason the point B is cleared. Separation of the contacts at either B or C again starts the body maker. If the body maker is started again in operation through the starting of the flanger unit the elevator is not again rendered operative until the point D is clear, in which event ample time is provided for consumption of cans by the flanger while the blanks are being passed through the body maker. It will be noted that the body maker feed is not stopped by the accumulation of cans at the point B unless the flanger has also stopped and contact made at the point C. The body maker assumes operation upon opening of the contact at B or immediately upon the starting of the flanger into operation again, the short or shunt circuit being interrupted then between the points 100 and 102 (Fig. 3). With the control thus constructed, it will be manifest that the body maker starts immediately upon the starting of the flanger and independently of the number of cans in the zig-zag conveyor leading to the flanger.

Body maker control circuits

An electromagnet 76 when energized, as will be presently described, permits operation of the blank feed to the body maker and an electromagnet 77 when energized delivers power to the elevator 55. A source of power 78 is provided for the energizing of these magnets and others in the control system. Reference character 79 indicates what may be termed a live lead and reference character 81 a ground return to the power source 78. Wire 82 leads from wire 79 to a clutch lever set of contacts 83 associated with the main starting lever 84 of the body maker, so that when power is withdrawn from the body maker by the operator and the entire body maker stopped no current is delivered to the magnet 76. A wire 85 connects contacts 83 with a lamp 86 which is provided to protect the source of power when any of the short circuits contemplated in connection with the body maker are effected. Wire 87 leads from this lamp to magnet 76 and from magnet 76 wire 88 is grounded by wire 81 to source of power. The foregoing is the circuit during body blank feeding.

A wire 89 is tapped from wire 87 to a contact 91 at the point A at the top of the conveyor 55, the companion contact being connected by wire 92 in the ground connection with return 81. This is the circuit stopping the body maker upon congested condition at the top of the elevator 55. The elevator receives its power from line 79 through wire 93, lamp 94, wire 95, clutch magnet 77 and wire 96. When contact is closed at A the magnet 77 is short circuited by wire 79, wire 93, lamp 94, wire 95, a wire 97, to a contact 98, a companion of which is connected to return wire 92. The contacts 91 and 98 open and close together and accordingly stop and start the body maker feed and the elevator simultaneously under certain conditions.

The body maker feed magnet 76 is adapted to be short circuited after stopping of the flanger as will now be described. A wire 99 is tapped to wire 89 and connects with a contact at the point B. The companion contact at this point is connected by a wire 101 with a contact 102 at the point C at the flanger. The companion contact at this point is mounted to move with the armature 103 of magnet 104 which when de-energized prevents feeding of cans into the turret of the flanger. This companion contact is connected by wire 105 to ground return 81, so that completion of the circuit just described at the points B and C, de-energizes magnet 76 at the body maker.

The circuit for de-energizing magnet 77 upon accumulation of cans at the point D in the leg 56 is accomplished by wire 106 leading to one of the contacts at D and wire 107 grounding the other contact to return 81.

Control for flanger

The feeding of the formed bodies into the flanger is interrupted under three different conditions. One of these is the failure of the body maker behind the flanger to maintain a sufficient storage of cans in the zig-zag conveyor, the arrangement being such that if the supply of cans falls below the point E in leg 59 further feed will stop until accumulation is effected to the point F of leg 58 and also until a turret pocket of the flanger is in accurate registration with the conveyor delivery part, this being determined by contacts at G in the flanger. A second condition occurs upon a congestion at the top of the elevator 63 at H and the third upon congestion at the point I of conveyors 64.

Adverse conditions at the point E is without effect upon elevator 63 while adverse conditions at either of the points H or I results in immediate and simultaneous stoppage of the elevator 63.

Flanger control circuits

As has been said, the flanger is provided with flanger control feed magnet 104. This magnet is energized under normal running condition by a circuit to be now described. Wire 107 leads from power wire 79 to one of two contacts 108 associated with flanger control lever 109, wire 110 leads from the other of said contacts to circuit protecting lamp 111 which in turn is connected by wire 112 to the magnet coil. The other end of this coil is connected to a contact 113 which engages during the normal operation of the flanger with a movable contact 100 on the armature of the magnet, which contact 100 is grounded to wire 81 by wire 105 already mentioned.

The circuits for shorting magnet 104 are as follows: (a) for contact E, wire 114 tapped to wire 112, wire 115 connecting wire 114 to one of the contacts at E and wire 116 to ground return 81, (b) for contacts at H, wire 117 from wire 114 to one of the contacts at H and wire 118 to ground return from the other contact, (c) for contacts at I, wire 114 to a contact at I and wire 119 from another contact at I to ground return 81.

After the magnet 104 of the flanger has been short circuited at any one of the points E, H or I and the flanger feed halted, the magnet does not become re-energized until feeding conditions in the zig-zag conveyor back of the flanger are proper. The contact 100 on the armature of the magnet 104 is separated from contact 113 and the armature is not raised until a connection is made to the ground return 81 with the magnet coil to the contacts F and G. The wiring for this comprises wire 119' from magnet coil to a contact at G, wire 121 from a companion contact at G to a contact at F, and wire 122 from companion contact at F to ground return 81. The circuit for again starting the flanger comprises then wires and parts 79, 107, 108, 110, 111, 112, magnet coil 104, wire 119', contacts G, wire 121, contacts F, wire 122 and ground return 81. The completion of this circuit energizes the magnet and lifts the armature and when this occurs direct connection is made between the coil and the ground return at G' through wire 105, and operation proceeds as before interruption.

The control for the elevator 63 and its stopping in association with the flanger is a mere duplication of the control for the elevator 55 as governed by the contacts at D and A. Wire 123 supplies clutch magnet 124 (at H) and wire 125 connects to ground return 81. The magnet 124 is short circuited at I by wire 126, contacts 127 and return wire 119 and at H by wire 128, contacts 129 and return wire 118.

*Control for double seamer*

The control shown on the drawing and illustrating the preferred embodiment of the invention is adapted to prevent feeding of can bodies into the double seamer under three different sets of adverse conditions. One of these is the stopping of the tester in which event the double seamer is permitted to operate until cans reach the point J in the transfer leg 68. Contacts are also arranged at the point K in magnet 154 which controls the feed to the tester and both the contacts J and K must be closed before the double seamer is rendered inactive by means of the circuit under discussion, the contact K by stoppage of feed to the tester and the contact J by accumulation of cans in the transfer mechanism.

Another of the conditions stopping feeding into the double seamer is failure of supply from the flanger. If the can bodies in the runway 64 are not sufficient to maintain a supply as high as the point L in the runway, contacts at this point are closed so that magnet 141 becomes de-energized and the feeding is interrupted.

The third condition interrupting the feed to the double seamer is failure of supply of can ends to the double seamer. The can ends are carried in a stack in the double seamer and individually removed from the bottom of the stack as cans present themselves to receive the ends. The can end feed and adjacent parts are not shown in Fig. 2, reference being had in this connection to Figs. 21 and 22, M representing the contact device generally for this control.

After interruption of the feed to the double seamer a starting control is provided to come into action after conditions are satisfactory at the point J, L and M when and not until when cans have accumulated in conveyor 64 to a point N rearwardly of the point L and the timing of the turret presents a pocket to receive the first can, this being determined by contacts arranged at O (Figs. 14 and 16). Contacts N and O are located in a starting electric circuit for the double seamer feed and the energizing of magnet 141. As the result of such energizing an operating circuit is completed by contacts P located in the magnet itself.

The only interruption to the elevator 67 presented in connection with the double seamer control occurs when contacts at the point Q in the elevator circuit are engaged by filling of conveyor leg 68, this being after the double seamer has stopped because of accumulation to the point J. No detector or contacts are arranged at the top of the elevator 67 because the can bodies which pass this point have been sized in the double seamer and are sufficiently substantial because of the applied ends to render protection against jamming unnecessary.

*Electric control for double seamer*

The double seamer magnet 141 is energized under normal running conditions from power wire 79 to wire 142, manual clutch lever control contacts 143, wire 144 from said contacts to lamp 145, wire 146 from lamp to magnet coil, contacts P, one of which is carried by the armature, and wire 147 to ground return 81.

The circuit interrupting double seamer feeding upon stopping of the tester and accumulation of cans past point J by short circuiting of magnet 141 is wire 148 tapped to wire 146, wire 149 to contacts J, wire 151 to one of fixed contacts K, indicated by reference character 152, second contact 153 carried by and movable with the armature of magnet 154 for controlling feed to the tester and adapted to engage contacts 152 when the tester magnet is de-energized, and wire 155 to ground return 81.

The short circuiting of magnet 141 upon failure of cans in transfer runway 64 to the double seamer is accomplished by wire 148 tapped to wire 146, wire 156 tapped to wire 148, contacts L, and wire 156' to ground return 81.

The circuit for short circuiting magnet 141 upon failure of the can end supply comprises wire 148 already mentioned, wire 157 tapped to wire 156, detector contacts M at the can end stack and wire 158 to ground return 81.

The starting circuit for re-energizing coil of magnet 141 after interruption comprises wire 144 to lamp 145, wire 146 to coil, wire 162 from coil, to contacts O closed only when turret pockets are timed to receive can bodies, wire 163 to contacts N closed only when cans fill runway 64 to point N and wire 164 to ground return 81. Completion of this circuit energizes coil of magnet 141 lifting the armature and establishing the normal operating circuit already described, devices at the points N and O thereafter exercising no further influence until feeding is to be again started after a later interruption.

Reference character 165 indicates the clutch control magnet for the elevator 67 and its normal energizing circuit is wire 166 through lamp 167 to magnet coil and wire 168 to ground return. Stopping of the elevator by short circuiting this coil and when cans have been accumulated in runway part 68 past the point Q is accomplished by a circuit comprising wire 169 tapped to wire 166 and leading to contacts Q and wire 161 from contacts Q to ground return.

Control for tester

The feed to the tester is stopped under only two conditions, which are the failure of the cans back of the tester in the conveyor leg 69 to the point R and the clogging of the delivery mechanisms from the tester shown on the drawing typically at the point S, it being understood that any number of points S may be given contacts if desired. After the magnet has once been de-energized and the feeding into the tester stopped, the coil of magnet 154 is energized again (when conditions have been remedied) through a starting circuit which requires accumulation of can bodies to the point T in conveyor leg 68 in the timed presentation of can receiving pockets at the feeding station by the closing of contact at the point U in the tester itself. One of the points K associated with the feed magnet 154 of the tester is, as has been stated, connected with the armature of this magnet and moves with it. The completion of the starting circuit just described energizes the magnet and lifts the armature and creates the normal operating circuit for the magnet which is independent of conditions at the points T and U and until interruption again occurs.

Electric wiring for tester

The circuit normally energizing coil of magnet 154 comprises wire 171 to tester control lever 172, wire 173 from contacts at lever 172 to lamp 174, wire 175 to coil, upper contacts at K and wire 155 to ground return.

The circuit for short circuiting coil of magnet 154 when insufficient cans are arranged in runway leg 69 comprises wire 176 to wire 177 to contacts R to wire 178 to ground return 81.

The circuit for short circuiting coil of magnet 154 upon adverse conditions in the delivery devices from the tester comprises wire 176, wire 179 tapped to it, contacts S and wire 181 to ground return.

The starting circuit for magnet 154 includes wires 171, lever contacts 172, wires 173 and 175 to coil, wire 182 to contacts U, wire 183 to contacts T and wire 184 to ground return. The coil of magnet 154 having been energized by this circuit lifts the armature and establishes the normal operating circuit already described, the continuation of operation being independent of subsequent conditions at points T and U.

Mechanical control of body maker feed

The feeding of the flat body blanks from the stack in the body maker is accomplished by suction device of any desired character. The control of this feed is accomplished in accordance with the disclosure of this application by interrupting the application of the suction to the feed mechanism. Referring to Figs. 5 to 8 reference character 201 indicates the cylinder of a suction pump containing a piston (not shown) of usual or preferred type. At the head end of this cylinder a rigid sleeve 202 is mounted and this sleeve communicates with a flexible hose 203 leading to the feeding devices. The sleeve 202 is provided with a boss 204 providing a valve seat adapted to be closed by a valve 205 carried by a bell crank lever 206 pivoted upon the cylinder head. The bell crank lever 206 is connected with a rod 207 slidably engaged through a boss 208 extending from the cylinder. An arm 209 is arranged to extend over a pin 211 reciprocating with the piston, this pin imparting reciprocation in one direction to the rod 207 and through the rod 207 to the bell crank 206. Reciprocation normally is produced in the opposite direction by a spring 212 arranged on rod 207 and between bracket 208 and a collar 213.

In the normal operation of feeding blanks to the body maker, the mechanism just described applies and breaks the vacuum at the suction feed, in timed relation with the operations of the body maker itself.

The magnet 76 already described as adapted to interrupt the feeding action, is mounted adjacent the cylinder 201 and has associated with it a device which it controls for preventing the closing of the valve 205 when feeding is to be interrupted. The armature 214 of the magnet is connected by a link 215 to a detent 216 pivoted at 217 on a bracket arm 218. This detent is arranged adjacent a stop collar 219 fast on the rod 207. When the magnet is energized the armature is elevated in the position shown in Fig. 7 so that the stop collar may reciprocate back and forth beneath it. When, however, the magnet becomes de-energized the armature drops to the position shown in Fig. 8 and the detent engages the stop collar in its spring actuated reciprocations to prevent closing of the valve.

*Mechanical constructions at contacts in transfer means*

Each of the conveyors 55, 63 and 67 receives its power at the top, reference being had to Fig. 9. Reference character 221 indicates a power shaft carrying a bevel gear 222 which meshes with a bevel gear 223 on elevator shaft 224 having bearing in bearing bracket 225. The upper elevator drum or pulley 226 is loosely mounted on shaft 224 and over this the elevator proper is trained. The pulley 226 is adapted for driving connection with the shaft 224 by means of a magnetic clutch 227 of any usual preferred type and construction. This clutch is provided with two contact rings 228 and 229 respectively engaged by brushes 231 and 232 which deliver current to and receive it from the coil of the magnet of the clutch. As has already been described, the clutches are connected and disconnected by interrupting the current to them at the various contacts governing the elevator action in the electric circuit.

The detectors and the general contact arrangements at the tops of the two elevator legs 55 and 63 are illustrated in Figs. 19 and 20, it being understood that the same construction is or may be employed at both locations, the elevator leg 55 being selected as illustrative. The elevator belt 55 rolls the cans up against a fixed upright 233 and over onto the upper ends of angle irons 234 which constitute the lower and guiding parts of the inclined runways. A bar 235 is mounted above and centrally of the angle irons 234 and confine the cans as they move down in the transfer action. A pivoted deflector 236 engages each can 237 and directs it positively into the runway. This deflector is comprised of two leaves arranged on opposite sides of the elevator belt and these leaves are fixed to a lever 238 pivoted at 239 on the end of upper bar 235. The lever 238 has an arm 241 arranged above a roller 242 of contact device 243. This contact device is adapted to provide the circuit controls at the points A and H of the assembly and wiring diagrams. Its detailed construction will be later described along with the other contact devices employed.

It will be noted that at the points D, B, F, I, N, Q, J and T detectors are arranged to close contacts in the electric control when cans or can bodies have accumulated there in storage. The can bodies ordinarily pass along the runway legs in spaced relation and in storage are arranged closely together. The detectors just mentioned are provided at each of these points and are adapted for action under the weight of a closely arranged lot of cans but remain unaffected by cans passing over them singly. Referring to Figs. 25 to 27, the angle irons 234 and the overhead bar 235 constituting the runway in Fig. 25, only the angle bar at one side being disclosed. A bracket 244 is arranged beneath the horizontal flange of the angle iron at each side and is provided with a knife bearing 245. Rods 246 are bent down at 247 and recessed for engagement with the knife bearings. The horizontal flange of each angle iron is slotted throughout the length of the rod and the opposite end of the rod is bent down at 248 to beneath the angle iron 234, this end being embraced by a collar 249. The collars 249 are connected to a rod 251 and links 252 extend down and are engaged by a second cross rod 253 from which an arm 254 extends laterally and through a collar 255 fixed upon it.

The collar 255 is in turn fixed to a contact operating member 256 of contact device 257 which will be later described in detail.

A counterweight 254' is mounted on the rod or arm 254 and is adjusted to sustain the rods 246 against the weight of spaced cans rolling over them and to permit deflection thereof and the consequent closing of the contacts in device 257 under the weight of an accumulation of cans as shown in Fig. 26.

At the points E, L and R detectors and contact devices are arranged for the exercising of controlling influence in the electric circuits upon failure of the supply of cans and the detectors at these points are so constructed and arranged as to separate the short circuiting contacts only when held down by the accumulation of cans. Referring to Figs. 28 to 30, it will be noted that a contact box 258 is mounted upon a bracket 259 beneath the runway and that a link or arm 261 fixed upon the contact shaft 262 engages a Z-rod 263 having at one end a counter-weight 264. This counter-weight tends to lift the off-set part 265 of the rod 263 up into the runway and the parts assume the position shown in Fig. 29 unless the rod is held to the position shown in Fig. 28 by the weight of cans resting upon it. When in the position shown in Fig. 28 the contacts of the device 258 are open and produce no interruption of any part of the line. When, however, there is no storage of cans at this point the parts move to the position shown in Fig. 29 and the magnet control is de-energized.

*Mechanical construction at flanger*

The mechanical parts of the flanger control, except the details of the feed control magnet involved, is shown in Figs. 10 to 13. Referring to Fig. 10, reference character 266 indicates the flanger base, reference character 267 the flanger housing and reference character 268 the flanger turret, this turret having pockets 269 to receive the cans for flanging from the runway leg 59. During the normal operation of the apparatus the cans are continuously fed into the turret pockets and upon the establishment of adverse conditions affecting the flanger means are provided to restrain the feed of the can body. These means comprise a pair of arms or levers 271 pivoted at 272 and provided with detaining pins at their lower end adapted to be moved into the path of can body travel when feed interruption is desired. The pivots 272 are short shafts mounted in bearings 274 and carrying toggle arms 275 in fixed relation with the arms 271 to cause these arms to move in and out conjointly as may be observed in Fig. 13.

One of the arms 271 is a part of a lever having a second arm 276 in turn link connected to armature 278 of magnet 104. When this magnet is energized the arms are retracted to inoperative position and feeding continues. Immediately upon deenergizing of the magnet however, the armature is moved inwardly (viewing Fig. 13) and the pins 273 enter into and hold the lowermost can in the runway.

The device for restraining resumption of can feed to the flanger comprises a cam 279 mounted on main flanger shaft 281 and engaged by a roller 282 upon an end of an arm 283 of a contact device 284, the construction being such that except when the high point of the cam is lifting the roll the contacts are open and the starting circuit for the flanger interrupted as earlier described.

Reference is now made to Fig. 35 illustrating both the magnet 104 of the flanger and 154 of the tester. The two magnets are alike in their construction and description of one will suffice for both. This magnet comprises a housing 291 enclosing coil 292 within which is arranged an axially movable armature 293, normally moved inwardly of the magnet by a spring 294 bearing on the armature and housing cap 295. The armature is provided at its lower end with a contact disk 296 adapted to contact with a lower contact arm 297 when the magnet is de-energized and an upper contact 298 when current is flowing through the coil 292 and the magnet attracted upwardly viewing the figures.

Reference character 299 indicates a supply wire to the coil and the companion wire 301 leads to terminal or contact member 298, and reference character 302 indicates the delivery wire from the coil. This is the magnet construction arranged at the points C and K on Sheets 1 and 2 of the drawings.

The magnet 141 is constructed exactly like the magnets 104 and 154 except that the bottom contact 297 and attendant wires and connections are omitted, and the magnet at the body maker indicated on the drawing at 76 is constructed, as shown in Figs. 36 and 37, like these magnets except that no contacts at all are employed. It comprises the movable armature 401, which is the counterpart of the movable armature 293, and coils and casings 399 and 398 are also counterparts of coils and casings 292 and 291. The magnet construction, except for these bottom contacts and assembly, may be standard throughout the line control and these bottom contacts and attendant devices merely attached to this standard magnet.

*Mechanical devices in control of double seamer*

On the drawings Figs. 14 to 16 display so much of the double seamer construction and attendant mechanism as is required to understand the mechanical devices controlling the feeding in of the can bodies to the double seamer in timed relation with its turret and Figs. 21 and 22 disclose the mechanical devices controlling the system or line upon failure of can end supply.

The turret 303 receives the cans for delivery to the seaming devices from conveyor leg 64 and is provided on its under side with cam members 304 which are adapted to engage a lever 305 fixed in a collar 306 pivoted to shaft 307 of contact box 308. The lever extends on past the contact box and is provided with a counter weight 309. Whenever a turret pocket comes into properly timed relation with the can delivery means the lever 305 is depressed closing the switch contacts at O in series with the magnet 141, the details of which have already been described in connection with the operation of the flanger magnet.

The vertically moving armature 311 of this magnet is connected with a lever 312 pivoted at 313 beneath the can travel and provided at its free end with a pin 314 adapted to be projected up into a can body when adverse conditions require interruption of can body feed.

In Figs. 21 and 22 a stack of can ends 321 is arranged between stack posts 322 extending up through double seamer parts 323. A lever 324, having one end bent down into engagement with a stack of can ends is held in offset collar 325, pivoted at 326 to contact device 327 mounted alongside the stack holder. A counter weight 328 presses the lever inwardly of the stack and is restrained by the can ends therein. When the supply of can ends has been exhausted until the top of the stack is beneath the lever the weight moves down projecting the lever into the stack space and closing the contacts of the device to short circuit the double seamer feed control magnet, this being the action at point M.

Mechanical devices in control of tester

So much of the tester control mechanism as is necessary to an understanding of the present invention is disclosed in Figs. 23 and 24. The tester comprises a large rotating disk 341 which carries can receiving pockets 342 in which the cans are placed for testing. Cans are delivered to the tester from conveyor legs 69 supported at its lower end at 343 from the main frame 344 of the tester itself. Magnet K already described for controlling the feeding to the tester is mounted upon a bracket 345 on the frame 344 and its armature is connected at 346 by a link 347 with a can detaining lever 348 pivoted at 349 to a bracket 351 extending up from bracket 345. The lever 348 has a curved end 352 adapted to be projected across the path of can travel when magnet K is de-energized. As will be readily understood from an inspection of Fig. 23, this action is facilitated by a weight 353 mounted on the end of the lever beyond its connection with the link 347. The contacts U are located in a contact device 354 located adjacent the travel of the tester wheel or disk and a roller 355 carried upon the end of a contact operating arm 356 is arranged for engagement by one or more cams 357 on the periphery of the tester wheel.

Detector and contact controls in delivery conveyor

Reference being had to Figs. 2, 31 to 34, the cans after being counted and delivered to the runway 74 are moved along for disposition by a cable 361 running upon a base plate 362 and between side guides 363 conveying the cans along for disposition. As has already been described, means are provided to interrupt the feeding to the tester and other units of the line upon congestion of the cans at predetermined points in this conveying and storage system. A spring bar 364 having its ends bent at 365 and held in fixed collars 366 is or may be provided to extend into the runway and more closely confine the cans. A detector bar 367, fixed at one end to a collar 368 carried by a pivoted arm 369, is arranged to extend into the path of can travel and to be undisturbed when cans are freely passing by it. When, however, congestion occurs and the cans press upon each other and move to somewhat staggered relation the opposite end of the bar 367 actuates a contact device 371 containing contacts to short circuit magnet K as earlier described.

The bar 367 has its end turned down and out at 372 and into engagement with an arm or offset collar 373 for actuating the contacts.

Mechanical construction of miscellaneous control units

Figs. 39 to 45 illustrate various contact assemblies employed or preferably employed in the control. All of these have or may have certain common features of construction which will now be described. Figs. 44 and 45 show the arrangement and construction of contacts and devices at D, B, F, E, N, L, Q, J, T, R and S and such devices comprise a housing 381 adapted to be closed by a plate 382. Two contact members 383 are secured at 384 in the housing and are of Z-shape. Springs 385 normally hold these contacts in the position shown in Fig. 45. A cross-contact bar 386 is carried by an arm 387 to which it is held by a fiber supporting yoke 388, the ends of the bar 386 being located under the free ends of contact members 383. The arm 387 is mounted upon rock shaft 389 having bearing at 391 in the contact housing, rocking of this arm engaging and disengaging the bar 386 with and from the two bars 383 so that when engaged current passes in at one bar or contact 383 through bar 386 and out at other bar 383. Figs. 42 and 43 illustrate the contact devices at G, O and U and these differ only from the contact devices just described in that an arm 392 is fixed centrally on shaft 389 and carries a roll 393 for engagement with the cam parts described as at these stations. An arm 394 extends out for engagement with a spring 395, the position between it and the housing is provided to cause the rolls 393 to follow the cam.

Figs. 39 and 40 illustrate contact devices like those illustrated respectively in Figs. 44 and 42 except that the devices are adapted to close two sets of contacts instead of one. (A, H, and I.) A wire 396 is engaged to plate 386 and to a terminal 397 fixed in the device. Each of the plates 383 is therefore adapted to deliver current into the contact device, both circuits being completed through bar 386 and wire 396 to ground return.

Referring to Figs. 17 and 18, reference character 402 illustrates a typical manual control member or lever associated customarily with each of the machines in the line, and reference character 403 represents a contact control adapted to interrupt the supply of current to the feed magnet when the lever or member is manipulated to cut off the power to the machine. The arm 404 controlling the contacts is connected by a rod 405 which rod has sliding engagement through an eye 406 mounted on the lever 402, an adjustable stop collar 407 being provided on the rod to cause actuation of the contact at the proper time.

The contact device 403 is shown in Fig. 41 and differs only from the contact devices already described in that the roll 393 has been removed and connection made between the pivot pin 408 and the rod 405.

*General operation*

Generally speaking, the operation of the apparatus may be briefly described and summarized as follows:

Assuming the line of can making machinery to consist of the requisite number of units constructed and timed to operate at synchronized production, i. e., the speed of the various units being calculated with relation to the speed of the others, these units are adapted in accordance with the invention for uninterrupted operation so long as conditions throughout the line remain as contemplated and desired. Should, however, any mishap occur or any individual unit produce at greater or less rate than is intended, the entire system automatically accommodates itself to prevent resulting damage to either the articles passing through the system or the machines operating upon them. Where adverse conditions are created, the machines immediately affected are first restrained from further operations by cessation of feeding and as a result affect other machines, both behind and in front of these immediate machines, and their operation too is stopped. Correction of the adverse condition automatically causes resumption of production in such a manner as to protect against further damage and with minimum delay.

Assuming the line to be in further operation clogging of cans at the top of the elevator 55 at A (as for example the presentation of a deformed body) stops the elevator 55 and feed to the body maker is halted. Blanks previously fed into the body maker pass through it and are held at the bottom of the elevator until the elevator is again started by removal of the deformed can. If the flanger stops or is stopped for any cause, both the elevator 55 and the body maker for a time continue their operation and until cans have accumulated to the point B in the zig-zag conveyor to the flanger. Filling of this conveyor to the point B stops the feed of blanks to the body maker. The elevator continues to run, however, until cans arrive at the point D whereupon the elevator itself is stopped. Correction of conditions in the flanger or its resumption of operation thereafter causes the elevator to start again as soon as the cans in storage back of the flanger are consumed to free the point D and the body maker again starts when these cans are consumed to free the point B.

Feed to the flanger itself is halted if the cans in the supply or storage in the zig-zag conveyor to it fall below the point E and feeding is prevented until these cans have accumulated to the point F when the feed again starts operation in proper timing with the turret. By reason of the contacts G cans are prevented from feeding into it except in synchronism with its own parts.

The elevator 63 is halted and feed to the flanger is stopped if a deformed can is presented at the top of the elevator 63, as determined by conditions at the point H, the can bodies already in the flanger accumulating in the runway 62. Removal of the deformed body results in the immediate starting again of the elevator and the feeding to the flanger. This is again repeated if cans accumulate in the conveyor leg 64 to the point I and the elevator starts, and feed to the elevator is resumed when the cans in this conveyor leg have been consumed to free the point I.

The feeding into the double seamer stops when the supply of cans in the conveyor 64 has dropped below the point L. This feeding, once having been halted for any cause, cannot be resumed until the cans have accumulated in the conveyor 64 to the point N and the double seamer receiving turret pockets are in position to receive the can end, as determined at the point O inside the double seamer. Feeding to the double seamer is also stopped if the supply of can ends becomes exhausted, as determined by the contacts at the can end stack at M forming a part of the double seamer. It is also stopped when the supply of cans in the conveyor to the tester accumulate to the point J provided the tester itself is stopped and contact is made at the point K in the tester feed control magnet, the elevator 67 only stopping thereafter upon accumulation of the cans at the point Q.

Feeding to the tester is stopped when cans in the runway 68, 69 are not filling said runway to the point R and after this and any other stoppage of feeding to the tester, it cannot be resumed until accumulation in this runway reaches the point T and the pockets of the tester are in position to receive the first can as determined at the point U in the tester itself. The tester is also stopped by crowding the cans in the delivery runways 74 from the tester to the point S.

As it will be readily understood, the action of of all of the units is thus interlocked; while the various machines are started and stopped in synchronized relation with the other units in the line they are not all started and stopped simultaneously and each is controlled in accordance with its own requirements to delay its stopping until real need is presented and to start it in action again as soon as conditions permit it individually to function. We here attach a table showing the effect of the controlling contacts:

Contacts at A start and stop elevator 55 and body maker.

Contacts at B stop body maker if flanger is stopped.

Contacts at C stop body maker when cans have reached B.

Contacts at D stop elevator.

Contacts at E stop flanger for failure of can supply.

Contacts at F start flanger thereafter in cooperation with contact at G when sufficient cans have accumulated.

Contacts at G start flanger feed in timed relation with flanger and in cooperation with contact F; contact at C relieves flanger of influence of contacts G and F.

Contact at H starts and stops flanger and elevator 63 if deformed can is presented at top of elevator or jam occurs.

Contacts at I start and stop elevator 63 and flanger because of surplus cans in the conveyor 64.

Contacts at J stop feed to double seamer if tester is stopped and cans have accumulated to point J.

Contacts at K at tester cooperate with contact at J to prevent action of contacts at J while tester feed continues.

Contacts at L stop feed at double seamer for failure of can supply.

Contacts at M stop double seamer for failure of can end supply.

Contacts at N in cooperation with the contacts O in double seamer starts double seamer after stopping.

Contacts at O insure presentation of double seamer turret pocket to receive can end and cooperate with contacts at N.

Contacts at P at double seamer feed magnet relieves double seamer from influence of contacts at O and N after starting.

Contacts at Q stop and start elevator 67.

Contacts at R stop tester for failure of can supply.

Contacts at S stop tester because of excess accumulation in runways receiving cans from tester.

Contacts at T, in cooperation with tester timing contacts at U, start tester.

Contact at V relieves tester from influence of contacts at U and T after starting.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. The combination of a machine for performing an operation upon a can body and the like, means delivering can bodies from said machine after operation thereupon and an electric control causing interruption of the operation of said machine upon creation of a predetermined condition in said delivery means and causing also interruption of both said machine and said delivery means upon creation of another predetermined condition in said delivery means.

2. The combination of a machine for performing an operation upon a can body and the like, means delivering can bodies from said machine after operation thereupon and an electric control causing interruption of the operation of said machine upon creation of a predetermined condition in said delivery means and causing also interruption of both said machine and said delivery means upon creation of another predetermined condition in said delivery means, said control causing said machine to resume operation upon termination of said conditions.

3. The combination of a machine for performing an operation upon a can body and the like, means delivering can bodies from said machine after operation thereupon, and an electric control causing first interruption of the operation of said machine and thereafter interruption of the operation of said delivery means upon creation of a predetermined condition in said delivery means.

4. The combination of a machine for performing an operation upon a can body and the like, means delivering can bodies from said machine after operation thereupon, and an electric control having means causing simultaneous interruption of the operation of said machine and said delivery means upon creation of a predetermined condition in said delivery means.

5. The combination of a machine for operating upon a can body and the like, a transfer guide, a conveyer for receiving can bodies from said machine and delivering them to said guide, and an electric control for interrupting the operation of said machine and said conveyer, the machine in advance of said conveyer upon the creation of a predetermined condition in said guide, said control causing said conveyer and then said machine to successively resume operation upon termination of said condition.

6. In an apparatus for manufacturing cans the combination of a body maker, a flanger, means transferring cans from said body maker to said flanger, an electric control causing termination of operation of the flanger under certain predetermined conditions when its operation is too rapid, and causing also termination of operation of the body maker after a predetermined number of bodies are arranged in said transfer means.

7. In an apparatus for manufacturing cans the combination of a double seamer, a tester, means transferring cans from said double seamer to said tester, an electric control causing termination of operation of the tester under certain predetermined conditions when its operation is too rapid, and causing also termination of operation of the double seamer after a predetermined number of bodies are arranged in said transfer means.

8. In an apparatus for manufacturing cans the combination of a plurality of machines arranged in a line and connected by devices transferring the cans from the one machine to the next, and an electric control for said machines adapted to cause synchronized stopping of a said machine upon the stopping of a subsequent machine in the line and creation of predetermined conditions in the transfer means between them.

9. In an apparatus for manufacturing cans the combination of a plurality of machines arranged in a line and connected by devices transferring the cans from the one machine to the next, and an electric control for said machines adapted to cause synchronized stopping of a said machine upon the stopping of a subsequent machine in the line and creation of predetermined conditions in the transfer means between them, said control operating to effect starting of the earlier machine immediately upon the starting of the later machine and without regard to said conditions.

10. In an apparatus for manufacturing cans, the combination of a plurality of machines adapted to successively operate in the making of cans, a transfer device between them and an electric control synchronizing the action of said machine, said control comprising feed control magnets and said magnet when in one de-energized condition forming a part of the circuit adapted to interrupt the feed of an earlier machine and when re-energized to cause feeding to start in said earlier machine.

11. In an apparatus for manufacturing cans, the combination of a plurality of machine units adapted to operate successively in the making of cans, transfer devices between said units and including an elevator for raising the can bodies as an incident to their transfer from one unit to the next, and an electric control for said elevator adapted to actuate the elevator and to interrupt said actuation upon predetermined conditions in the can line.

12. In an apparatus for manufacturing cans and the like the combination of associated machine units adapted to successively operate in the making of the cans, transfer means connecting said units and including a moving elevator and an electric control for said machines and said elevator adapted to start and stop the feeding to said units and the actuation of said elevator in synchronized non-simultaneous relation when the operation of said units is respectively too slow or too fast and in accordance with predetermined conditions and their alteration.

13. In an apparatus for manufacturing cans the combination of a plurality of machine units adapted for successive operation in the making of the cans, transfer means from one unit to the next, and an electric control for synchronizing the action of said units and said transfer means and itself controlled by conditions at said units and in said transfer means, said control including devices for protecting the partly made cans against damage upon resumption of the operation of the unit after inaction produced by predetermined conditions.

WALTER K. CABOT.